May 24, 1949. T. G. PRENTICE 2,470,861
FISHING LURE
Filed Sept. 1, 1945

INVENTOR.
Thomas G. Prentice.
BY
Stanley Lightfoot.
ATTORNEY

Patented May 24, 1949

2,470,861

UNITED STATES PATENT OFFICE 2,470,861

FISHING LURE

Thomas G. Prentice, Detroit, Mich.

Application September 1, 1945, Serial No. 614,002

1 Claim. (Cl. 43—35)

This invention relates to fishing lures of the type generally known as trap lures, and has for its object to provide a very simple and easily operable device in which the connections of the hook will be for the most part concealed within the body of the bait with the points of the hook protectively engaged against one end of the body of the lure until such time as the lure is seized by a fish, whereupon the hook will be released to move rearwardly and free of the body of the lure and be projected more or less violently into the mouth of the fish to ensure adequate trapping of the fish.

A further object is to provide in a trap lure of the type referred to a hook releasing mechanism reciprocable within the body of the lure and held in closed position by releasable securing means operable by the strain on the fishing line of a fish tugging on the body of the bait.

A still further object is to provide in such a device an arrangement involving the use of a looped fishing line as the releasing means.

Still further objects or advantages additional or subsidiary to the aforesaid objects, or resulting from the construction or operation of the invention as it may be carried into effect, will become apparent as the said invention is hereinafter further disclosed.

In carrying the said invention into effect, I may provide the novel construction and arrangements of parts hereinafter described, by way of example, having reference to the accompanying drawing, wherein.

Similar characters of reference indicate similar parts in the several figures of the drawing.

Figure 1:
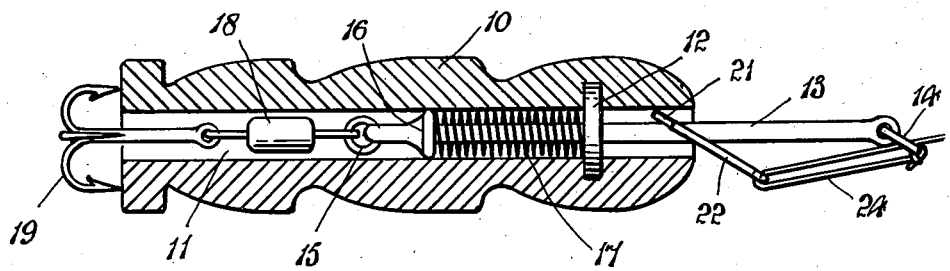
Figure 1 is a sectional elevation of the improved trap lure in secured or closed position of the parts.

10 is the body portion of the device which, for convenience, may be of two-part construction in which the parts are cemented or otherwise secured together, said body having a bore 11 running therethrough. Toward the head of the said body a washer 12 is embedded through which a rod 13 is reciprocated. This rod 13 has a ring 14 attached to the front end and a further ring 15 at the rear end thereof.

A shoulder or abutment 16 is formed or otherwise provided near the rear end of the said slidable rod, and a compression spring 17 is arranged on the rod between the said washer 12 and the said abutment 16.

Figure 2:
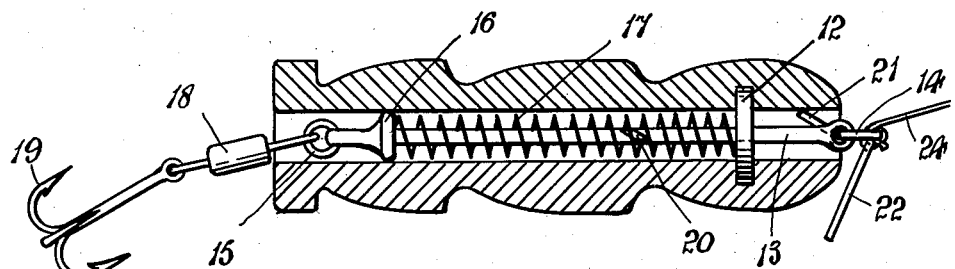
Figure 2 is a similar view to Figure 1 showing the parts in released or open position.
Figure 3:
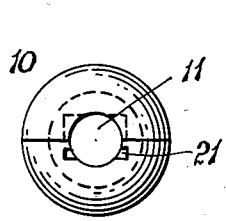
Figure 3 is a front end elevation of the body of the device.
Figures 4, 5:
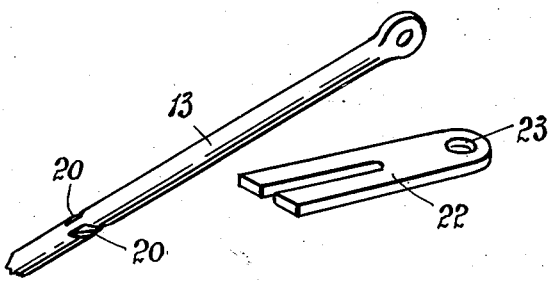
Figure 4 is a fragmentary detail perspective view of the sliding rod.
Figure 5 is a detail perspective view of the locking stop member removed.

Attached to the rear ring 15 by means of a swivel connection 18 is a hook 19 which, when the spring 17 is in its expanded position, hangs freely on its swivel beyond the rear end of the hollow body portion 10 of the device as shown in Figure 2.

When the rod 13 is pulled forwardly through the bore of the body 10 of the device the spring 17 is compressed and the shaft of the hook 19 drawn in to the rear end of the bore of the said body, causing the points of the hook to engage the rear end of the said body and be protected thereby; and when the said rod 13 is so drawn forward to that extent inclined slots 20 formed in the wall thereof are aligned as to plane with an inclined recess 21 formed in the body 10.

22 is a forked stop element which may, in such position of the parts, be slid into mutual locking engagement with the slots 20 of the rod 13 and the recess 21 of the body 10 to secure the rod in its forward position against the resistance of the compressed spring 17. The outer end of this element 22 is provided with a hole 23 through which a fishing line 24, previously passed through the ring 14 may also be passed, the end of the line being doubled back and attached to the said ring 14, as shown in Figure 1.

It will be apparent that in the closed position of the device shown in Figure 1 the barbs of the hook are protected against fouling by weeds and against interfering with a fish grasping the body of the lure. When the lure is so grasped and additional strain on the line results from the tugging of the fish the loop 24 of the line will be pulled through the ring 14 thereby withdrawing the element 22 from its engagement with the slots 20 and 21 of the rod 13 and the body of the lure as clearly shown in Figure 2, whereupon the compression spring 17 is free to expand and project the hook and its parts of attachment from the bore of the lure and into the mouth of the fish in a manner which will serve to ensure the firm hooking of the fish before it has an opportunity to release its grasp on the lure and escape.

This invention may be developed within the scope of the following claim without departing from the essential features of the said invention, and it is desired that the specification and drawing be read as being merely illustrative of a practical embodiment of the said invention and not in a strictly limiting sense.

What I claim is:

In a device of the class described, in combination, a tubular body, a reciprocable member in said body, a spring biasing said member in a rearward direction in said body, a hook retractable against said body by movement of said member against resistance of said spring, a releasable element for locking said member in its hook-retracting position, and a line operably connected to said element to withdraw it from its locking to its released position when strained by a fish grasping said body, said element being slidably mounted on said line and, in its released position, being supported only by said line.

THOMAS G. PRENTICE.

REFERENCES CITED

The following references are of record in the file of this patent:

UNITED STATES PATENTS

| Number | Name | Date |
|---|---|---|
| 1,172,780 | Ferree | Feb. 22, 1916 |
| 1,318,073 | Gottschalk | Apr. 26, 1919 |
| 1,372,831 | Roderick | Mar. 29, 1921 |
| 1,791,084 | Pike | Feb. 3, 1931 |
| 1,816,235 | Schroeder | July 28, 1931 |